(12) United States Patent
Santhanam (10) Patent No.: US 7,813,753 B2
(45) Date of Patent: Oct. 12, 2010

(54) POWER CONTROL IN COMMUNICATION SYSTEMS

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 11/363,670

(22) Filed: Feb. 27, 2006

(65) Prior Publication Data

US 2007/0201405 A1 Aug. 30, 2007

(51) Int. Cl.
H04B 7/00 (2006.01)
(52) U.S. Cl. .................... 455/522; 455/69; 370/318
(58) Field of Classification Search .................. 455/69, 455/522; 370/318
See application file for complete search history.

(56) References Cited

U.S. PATENT DOCUMENTS

| | | | |
|---|---|---|---|
| 6,118,997 A | 9/2000 | Kim et al. | |
| 6,445,925 B1 | 9/2002 | Kwon et al. | |
| 6,631,121 B1 | 10/2003 | Yoon | |
| 7,082,472 B1 | 7/2006 | Feder et al. | |
| 2002/0136929 A1 | 9/2002 | Oikawa et al. | |
| 2003/0027580 A1 | 2/2003 | Goodjohn et al. | |
| 2003/0087645 A1 | 5/2003 | Kim et al. | |
| 2003/0189948 A1 | 10/2003 | Sashihara | |
| 2003/0199252 A1 | 10/2003 | Tiedemann et al. | |
| 2006/0039281 A1 | 2/2006 | Benveniste | |
| 2006/0148485 A1 | 7/2006 | Kangas et al. | |
| 2007/0153719 A1 | 7/2007 | Gopal | |

FOREIGN PATENT DOCUMENTS

| | | |
|---|---|---|
| EP | 1024606 | 8/2000 |
| EP | 1024606 A2 * | 8/2000 |
| EP | 1538810 | 8/2005 |
| WO | WO9914869 | 3/1999 |
| WO | WO02054622 | 7/2002 |
| WO | 03017621 | 2/2003 |

OTHER PUBLICATIONS

International Search Report—PCT/US07/062913, International Search Authority—European Patent Office, Jul. 2, 2007.
Written Opinion—PCT/US07/062913, International Search Authority—European Patent Office, Jul. 2, 2007.
International Preliminary Report on Patentability—PCT/US06/021384, International Search Authority—European Patent Office, Jun. 11, 2008.
US Non-Final Office Action issued in U.S. Appl. No. 11/364,148, on Jun. 11, 2009.
US Non-Final Office Action issued in U.S. Appl. No. 11/609,500, on May 21, 2009.

* cited by examiner

Primary Examiner—Raymond S Dean
(74) Attorney, Agent, or Firm—Raphael Freiwirth (57) ABSTRACT

Systems and methods for estimating transmit power in a communication system are disclosed. An estimate of a reverse channel condition is based on a received signal from an access point. A correction factor is determined based on at least one of the number of access points detected, a Rise-over-Thermal (RoT) at the access point, a message error rate, and a message size. Then the correction factor is applied to the transmit power determination.

25 Claims, 8 Drawing Sheets

POWER CONTROL IN COMMUNICATION SYSTEMS

BACKGROUND OF THE INVENTION

1. Field

The present invention generally relates to communication systems. More particularly, the invention relates to power control in communication systems that measure channel quality.

2. Background

Wireless communication systems have developed through various generations, including a first-generation analog wireless phone service (1 G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x", and 1xEV-DO standards, "1XEV", for example) or TD-SCDMA.

In wireless communication systems mobile stations or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station. For example, the control channel can be used to establish traffic channels, control power levels, and the like, as is known in the art. Generally, there are two types of power control for the reverse link, open-loop and closed-loop power control. The open-loop power control typically occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems a pilot signal can be use to estimate the channel condition and then determine a power estimate for transmitting back to the base station. The accuracy of the channel conditions and power estimation can greatly impact performance of the system, particularly in terms of latency of the system. For example, 1x and 1xEV systems will transmit an access probe at a first power level based on a power control algorithm. If the first access attempt does not succeed, then the probe is resent at increasingly higher power levels, until it is successful or the power level maximum is reached.

The existing open-loop power control algorithm used to transmit access probes over the Access channel in CDMA2000 1x-A and 1xEVDO networks tend to be prone to inaccuracies and can result in underestimation of transmit power for access probes. This leads to an increased loss rate of access probes over the access channel, particularly on the first access attempt. Accordingly, errors in the determination of the power level for the first transmission can lead to a high rate of unsuccessful first access attempts, which can cause increased system latency as the probes are resent. By limiting retransmissions of the access probes, the latency incurred by access probes can be reduced.

SUMMARY OF THE EXEMPLARY EMBODIMENTS

Exemplary embodiments of the present invention are directed to systems and methods for improved power control in a communication system.

Accordingly, an embodiment of the invention can include a method for determining an access probe transmit power comprising: estimating a reverse channel condition based on a received signal from an access point; determining a correction factor based on at least one of the number of access points detected, a Rise-over-Thermal (RoT) at the access point, a target message error rate, and a message size; and applying the correction factor to an open-loop access probe transmit power determination.

Another embodiment of the invention can include an apparatus comprising: logic configured to estimate a reverse channel condition based on a received signal from an access point; logic configured to determine a correction factor based on at least one of the number of access points detected, a Rise-over-Thermal (RoT) at the access point, a target message error rate, and a message size; and logic configured to apply the correction factor to an open-loop access probe transmit power determination.

Another embodiment of the invention includes a system for determining an access probe transmit power comprising: means for estimating a reverse channel condition based on a received signal from an access point; means for determining a correction factor based on at least one of a number of access points detected, a Rise-over-Thermal (RoT) at the access point, a target message error rate, and a message size; and means for applying the correction factor to an open-loop access probe transmit power determination.

Another embodiment of the invention can include a computer-readable medium on which is stored a computer program for determining an access probe transmit power. The computer program comprising instructions which, upon being executed, causes the computing device to perform a process of: estimating a reverse channel condition based on a received signal from an access point; determining a correction factor based on at least one of a number of access points detected, a Rise-over-Thermal (RoT) at the access point, a target message error rate, and a message size; and applying the correction factor to an open-loop access probe transmit power determination.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) base station transceivers (BTS), base stations (BS) or more generally access points. An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Additionally, although exemplary embodiments of the invention are described in terms of a wireless system and specific technologies such as CDMA 1x and 1xEV system, those skilled in the art will appreciate that the invention is not limited to the illustrated systems. For example, embodiments of the invention can include any system that uses a signal from an access point to estimate channel parameter and uses that estimation to control power in the reverse link. Those skilled in the art will appreciate that signals transmitted over many mediums can be considered to have channel parameters. For example, signals over wireline systems, such as copper wire, coaxial cable, fiber optic cables, and the like have channel parameters that can be affected by transmission/modulation frequency, modulation technique, noise sources, cross talk, medium characteristics, and the like.

Figure 1:
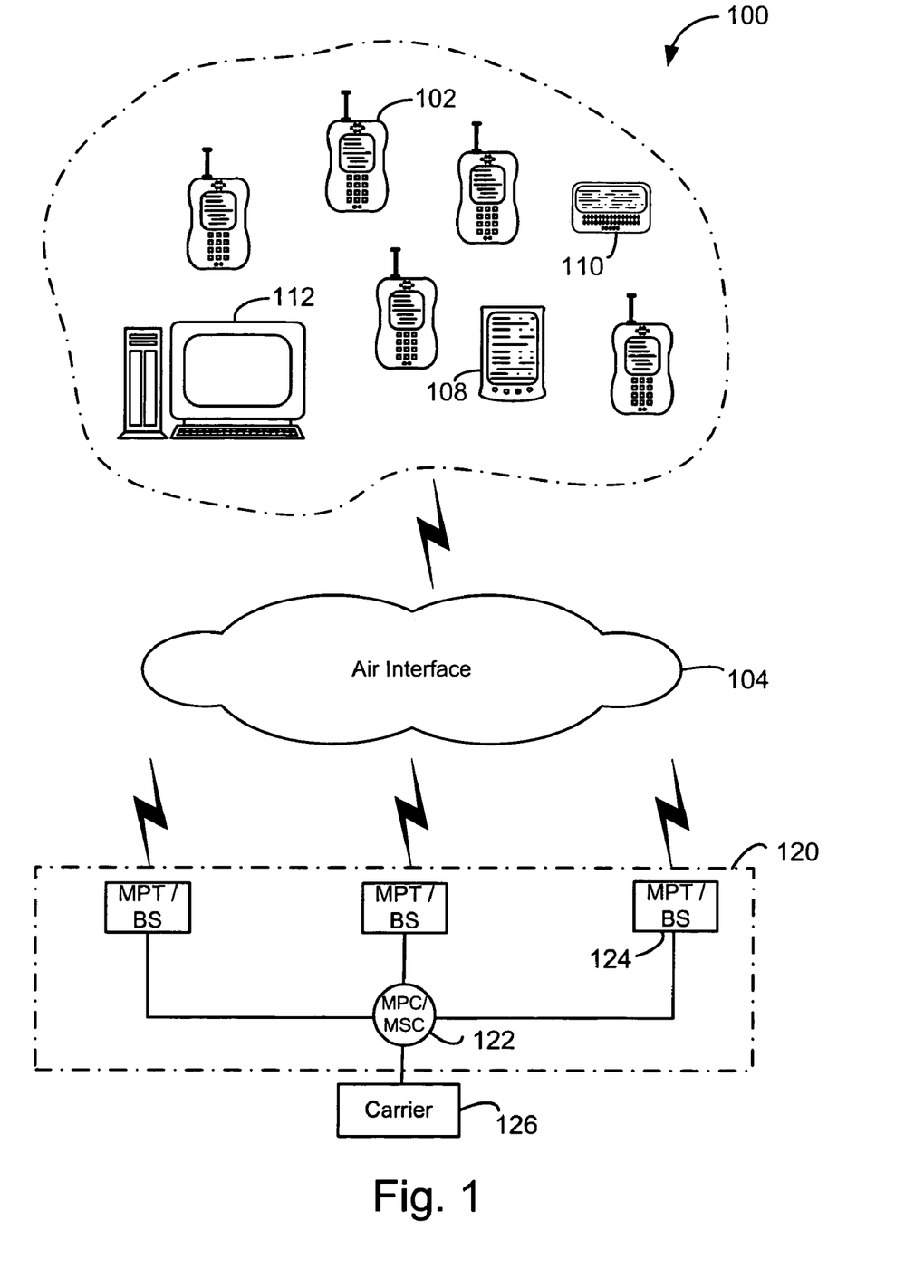
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably. Further as used herein the terms "access point", "modem pool transceiver (MPT)", "base transceiver station (BTS)", "base station (BS)" and like variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, a core network, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
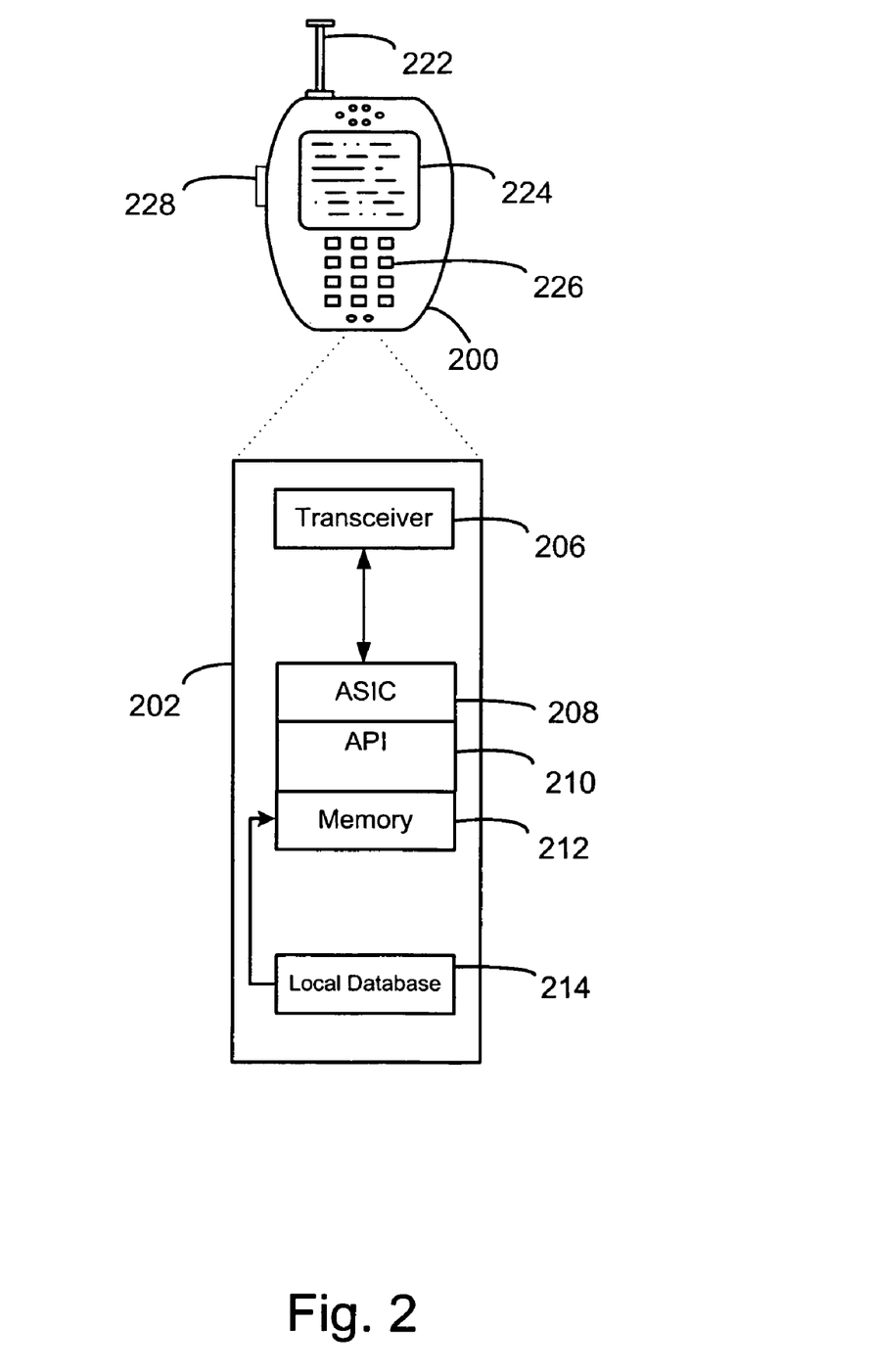
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein, related to access probe power control. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN 120.

As discussed in the background, paging can be used to notify an access terminal (e.g., a wireless device) that a communication directed to that terminal is available. Typically, the access terminal monitors a non-traffic channel (e.g., control channel/access channel) to check for paging directed to the access terminal and to receive power control signals and/or pilot signals that can be used to determine an initial power level of an access probe. Further, as discussed in the foregoing, the access probe's transmit power is determined by measuring a received signal strength (e.g., pilot signal) from a base station and estimating the forward link path loss. It is assumed that the path loss for the reverse link will be similar, so the access terminal can use this information to determine the access probe transmit power. The first transmission on the access channel may be in response to a page from the base station or to initiate a voice or data call. To avoid interfering with other access terminals, that initial power is set low and then the power is increased on successive attempts until the base station acknowledges the signal or a time out is reached.

Figure 3:
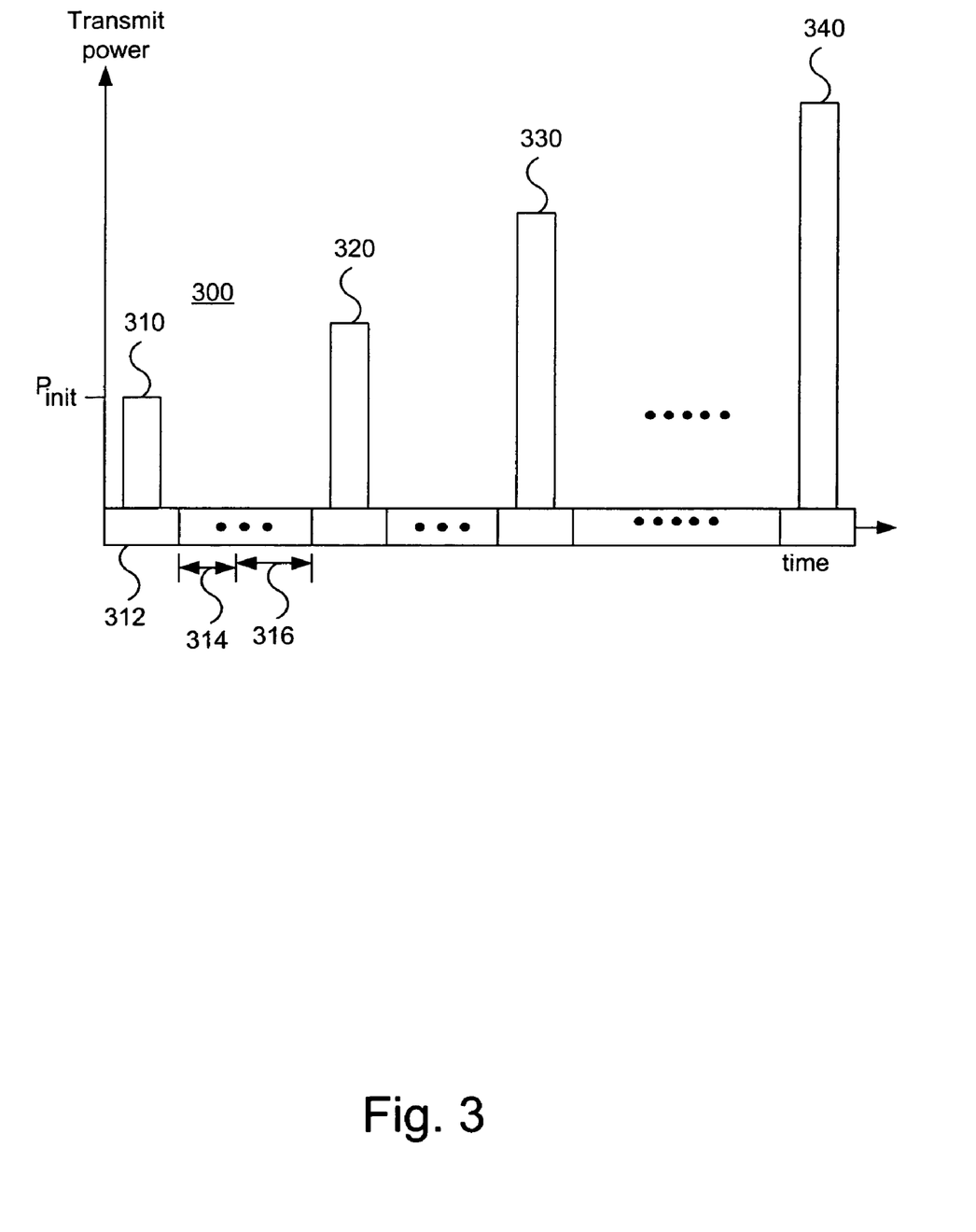
FIG. 3 is an illustration of an access probe sequence having several failed probe attempts.

For example, a sequence of access probes 300 is illustrated in FIG. 3. The first probe 310 is transmitted at an initial power ($P_{init}$) during a first access channel slot 312. The probe waits for acknowledgement from the access point (e.g., base station) or for an acknowledgement timeout 314 to occur. Then, a random backoff time 316 is determined before the next access probe 320 is sent. As illustrated the second access probe 320 and subsequent access probes 330 and 340, will be sent using increasingly higher transmit powers until an acknowledgement is received, a maximum power is reached or the access process timeout occurs.

A conventional equation to estimate the initial transmit power in decibels (dB) in the open-loop case is defined in the IS-95 standard as:

$$P_{init} = -P_r - \text{Const} + \text{NOM\_PWR} + \text{INIT\_PWR} \quad (1)$$

where $P_r$ is the received power from the base station in dB, Const is a default constant (e.g., −73 dB for cellular and −76 dB for PCS systems), NOM_PWR and INIT_PWR are adjustment factors in dB that can be set by the system operator. The NOM_PWR and INIT_PWR can be broadcast from the base station along with other data in an access parameter message. Additional details of the conventional access probe and initial power estimates are not provided as these are well known in the art and can be obtained from references such as Yang, "CDMA RF System Engineering", Artech House, Inc., 1998, pages 85-88 and 141-145, which are incorporated herein in their entirety.

However, the existing open-loop power control algorithms such as described above (Eq. 1) used to transmit access probes over the access channel in CDMA2000 1X-A and 1xEVDO (e.g., IS-856 standard) networks are prone to inaccuracies and can result in underestimation of the transmit power for access probes. This underestimation can lead to an increased loss rate of access probes over the access channel, particularly on the first access attempt. Existing open-loop power control algorithms often determine a transmit power that is lower because of: inaccuracies in estimating the path-loss between the access terminal and the access point/base transceiver station (BTS), crude estimation of the Rise-over-Thermal (RoT) at the BTS, and failure to take the size of the access message into account.

Accordingly, embodiments of the invention can provide correction factors to improve the initial (open-loop) transmit power determination which can be generally described as follows:

$$P'_{init} = P_{init} + P_{corr} \quad (2)$$

where $P'_{init}$ is the corrected initial power determination in dB and $P_{corr}$ is a correction factor in dB that can include constants and other system compensating factors. Additionally, the correction factors discussed in the following can be used in combination with, or in place of, the conventional system parameters and/or power determination ($P_{init}$).

Embodiments of the present invention can overcome at least some of the problems associated with the existing open-loop power control policy so that a target success rate on the first access attempt is achieved. Thus, embodiments of the invention can use a correction factor or term (e.g., $P_{corr}$) to improve the initial transmit power determination and the target success rate on the first access attempt.

For example, the correction factor/term may include compensation for the size of the access probe. The correction term may also be used to correct the estimated path-loss. The correction term may also take into account the actual Rise-over-Thermal (RoT) at the access point (e.g., MPT, BTS). Additionally, some or all of the proposed correction terms can be subject to lower and upper bounds, as dictated by the specific system parameters.

Accordingly, embodiments of the invention can be used to improve over the existing open-loop algorithm so that the number of access probe retransmissions is reduced. Limiting these retransmissions can reduce the latency incurred by access probes substantially (e.g., 200–300 msec.), reduce power consumption and reduce the possibility of collisions.

In one embodiment of the invention, the path-loss between the access terminal and the access point (e.g., BTS) can be determined with greater accuracy by only considering the demodulated energy of the pilot signal from the associated access point. Alternatively, corrections to the path-loss estimate can be made by comparing the pilot strength from the neighboring access points (in the access terminal's active set) with that of the pilot strength of the associated access point. Generally, this correction can be used when the access terminal is sufficiently far away from its associated access point but close to one or more neighboring access points, which refers to the state when there is more than one pilot signal in the active set. For example, this may occur when the access terminal is in a handoff region or in a high density region having several geographically proximate access points. In this case, a predetermined gain may be added (e.g., a 2 to 4.7 dB increase) to the initial open-loop transmit power of the access probe over the conventional open-loop value. The addition of the fixed gain (e.g., 3 dB) can significantly increase the success probability, regardless of the location of the access terminal within a cell of radius 1.25 miles.

As previously discussed, conventional systems (e.g., 1x and 1xEV open-loop power control algorithms) often determine an inaccurate (lower or higher) transmit power because of inaccuracies in estimating the path-loss between the access terminal and the access point (e.g., BTS, MPT) and failure to take the size of the access message into account. Additionally, conventional systems do not consider a target message error rate (MER) when determining the transmit power for access probes. Accordingly, embodiments of the invention include methods that address these and other deficiencies in conventional systems.

Figure 4:
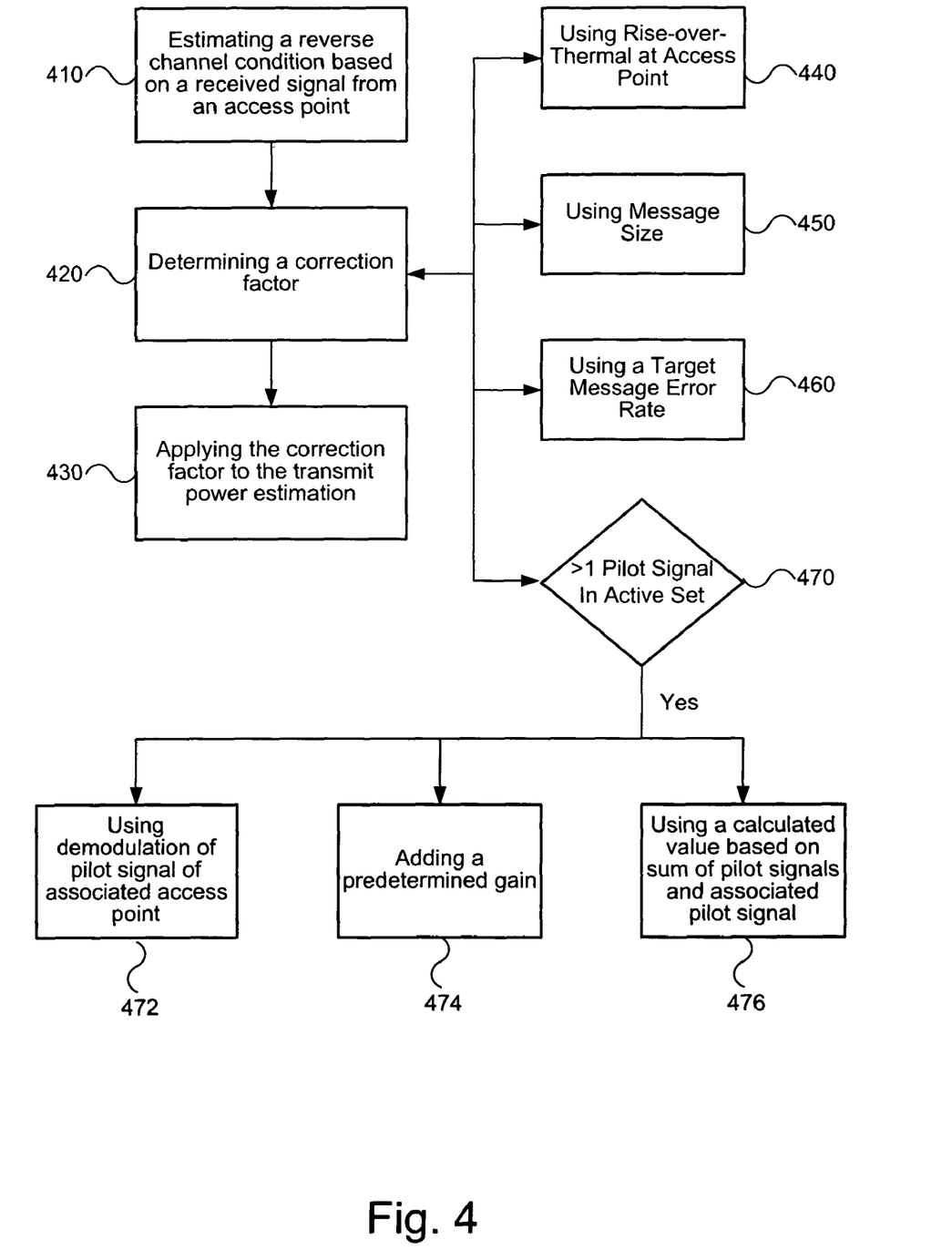
FIG. 4 is a flowchart in illustrating methods in accordance with at least one embodiment of the invention.

For example, referring to FIG. 4, a flowchart illustrating at least one embodiment of the invention is shown. Accordingly, an embodiment of the invention can include a method for estimating open-loop transmit power comprising estimating a reverse channel condition based on a received signal from an access point, 410. A correction factor can be determined, 420, based on at least one of a Rise-over-Thermal at the access point 440, a message size 450, a target message error rate (MER) 460 and the number of access points detected, 470. Then, the correction factor can be applied to the pilot signal transmit power calculation, 430.

Further, the various correction factors will be discussed in greater detail below and may include additional decisions for each correction factor. For example, in 470 when multiple access points are detected (e.g., number of pilot signals in the active set>1), then the correction factor can be determined in several ways. For example, only the pilot signal from the associated access point can be demodulated and the power measured from that access point can be used, instead of the sum of all received pilot signal powers, 472. Alternatively, a predetermined gain can be applied to the open loop power calculation, 474, (e.g., 2-4.7 dB, as discussed above) to compensate for the typical underestimation due to summing the power of multiple pilot signals. Still, in another aspect of the invention, a calculated correction term can be used, 476, where the calculation is based on the powers from all pilot signals and the pilot signal power from the associated access point. This calculation is discussed in greater detail in the following sections.

As will be appreciated from the description herein and as recognized by those skilled in the art, "applying" the correction factor can take many forms and is not limited to the specific examples illustrated and/or described herein. For example, in one form a new equation for the power estimation can be defined using terms of the correction factor. In other forms the correction factor can be added to conventional power estimations. Further, combinations of these forms can also constitute applying the correction factor as used herein.

Additionally, although embodiments of the invention are illustrated in conjunction with a wireless communication system that uses pilot signals, the received signal can be any signal that can be measured to derive or communicate any of the correction factors discussed herein. Further, embodiments of the invention are not limited to wireless communication systems and the access point is not limited to a BTS. For example, the access point can be a base station transceiver, a modem pool transceiver, a transmitter, a line amplifier and the like, used in communications systems such as optical, satellite, wireline, powerline, and the like communication systems. Still further, the principles of the invention are not limited to the 1x and 1xEV systems discussed, however, specific aspects related to these systems may be emphasized. For example, in systems that utilize a sum of the power of all received pilot signals, the correction factor can be based only on a demodulated received signal from the access point and all other received pilot signals from other access points can be disregarded. Further, the correction factor can be about 2dB-4.7 dB added to the open-loop calculated power value when more than one pilot signal is in the active set (e.g., an access terminal is in a handoff region).

Correction Term to Account for Rot at the BTS

Regarding the RoT, an accurate value of RoT at the access point (e.g., BTS, MPT) can be used to determine the correct transmit power at the access terminal (e.g., from the path loss estimation) so that it can meet a target signal-to-noise-ratio (SNR) at the BTS. The conventional computation of an open loop adjustment (e g., OpenLoopAdjust) assumes a fixed value of RoT and this value is the rise-over-thermal that an access probe is provisioned for. This value is fixed in conventional systems and typically set to a high value. For example, in a 1xEVDO network, a 7 dB RoT is recommended in the computation of OpenLoopAdjust and corresponds to an 80% reverse link loading. In general, under nominal loading conditions (e.g. 60% loading) the RoT is approximately 4 dB and therefore, the access probes are transmitted at a higher power than necessary. The dependence of RoT on the reverse link network loading can be considered as RoT=1/(1−load), where 0<load<=1. Accordingly, knowledge of an accurate RoT value at the access point (e.g., BTS) can be used in determining an accurate value for the transmit power of the access probe. For example, a correction term can be determined as:

$$\text{Correction term(dB)} = \max(\text{RoT}(t) - \text{RoT(preset)}, 0) \quad (2)$$

where RoT(t) is the actual RoT at the access point, which can be transmitted to the access terminal and RoT(preset) is the value set by a network provider in determining OpenLoopAdjust. It is possible that a network provider may use a smaller value of RoT (e.g. 5 dB) instead of the worst-case value of 7 dB in order to improve the coverage of the Access Channel (e.g., in 1x and EV-DO networks). In such cases, the above correction term may result in a positive correction. Based on simulation results, the likelihood of the RoT exceeding 5 dB can be relatively high, particularly when there are 40 or more active users in a sector.

In addition, the closed-loop power control performed at the access terminals when they are actively transmitting over the Reverse Traffic Channel (R-TCH) combats the increase in RoT so as to ensure that the Signal-to-Interference-plus-Noise Ratio (SINR) of its transmission at the receiver is maintained above a certain threshold. By doing so, each access terminal in closed-loop control is able to transmit over the R-TCH and achieve a target FER. For example, in voice applications (e.g., QChat), a typical operational FER can be considered one percent (1%) on the R-TCH.

When an Access Probe is transmitted on the Access Channel, it adds to the interference faced by access terminals transmitting over the R-TCH. This increase in signal interference will cause a reduction in the SINR of each of the access terminals transmitting over their respective R-TCH's. This will cause each access terminal's instantaneous FER to decrease. In order to maintain a fixed FER over the R-TCH, the closed-loop power control algorithm implemented in each access terminal in closed-loop control will react to the decrease in its SINR and increase the transmit power over the R-TCH by a small amount. For example, the default value in EVDO Rev. A is 1 dB. If there are 40 access terminals transmitting in a sector, the total increase in transmit power in the sector is then approximately 40 dB. The total increase in interference power is essentially equal to the total increase in transmit power per access terminal scaled down by the respective path-loss of each access terminal.

Even though the closed-loop power control increases the transmit power per access terminal, all other access terminals in the sector did the same causing a significant increase in interference mutually. The closed-loop power control algorithm will increase the transmit power once again to compensate for this increased interference. This process is continuous until the system converges to an equilibrium operational point. This equilibrium point is generally considered a Nash equilibrium point in the context of wireless cellular networks and can be shown to be a solution to a fixed point equation (see, e.g., R. L. Cruz and A. V. Santhanam, "Hierarchical Link Scheduling and Power Control in Multihop Wireless Networks," Proceedings of the 2002 Allerton Conference, Monticello, Ill., October 2002, which is incorporated herein by reference in its entirety).

During this time of transience the RoT in the sector is prone to significant increases, particularly, when the sector is heavily loaded. Since the Access Probe is not closed-loop power controlled it must be able to overcome the increase in signal interference apriori at the time of its transmission. A predetermined correction factor can be used to correct for future increases in RoT.

Accordingly, in one embodiment of the invention the access point/wireless network can periodically transmit the RoT at the access point. The access terminal can then use the RoT value to determine a relative loading of the sector. Then, based on this determination the access terminal can add an additional gain to the open-loop power determination to compensate for the expected increase in RoT as the access terminals in closed-loop control increase their respective transmit powers on the R-TCH. For example, the access terminal could add 0-2 dB to compensate for this expected increase in RoT based on its determination of loading in the sector (e.g., 0 dB for light loading and up to 2 dB for heavy loading). These values can be predetermined based on the network parameters and a table that correlates of RoT to loading and the associated correction factor (e.g., 0-2 dB) can be stored in the access terminal.

Accordingly, in an embodiment of the invention, since the access point determines its RoT or otherwise has its RoT available, the access point can broadcast its RoT value (e.g., RoT(t)) periodically to the access terminals in its sector. The access terminal can then use the received value of RoT in determining the effective noise floor and correspondingly correct the access probe power transmission level, which may include additional gain based on sector loading, as discussed above.

Correction Term Based on Access Probe Message Size

In another embodiment of the invention, the transmit power estimation of an access probe can be improved by adjusting the transmit power estimation using the access probes size (e.g., as measured in frames). For example, larger sized messages can be transmitted at higher power than smaller ones to compensate for potential channel/RoT variations during the course of message transmission. Accordingly, message size can be used as a correction factor to the access probe power level determination.

For example, when transmitting at a rate of 9.6 Kbps, an access probe can potentially be as large as four frames long. Each frame can be 16-slots in length. Thus, loss of even a single frame can lead to loss of the entire access probe. As a result, the transmit power for access probes that span multiple frames should be greater than the transmit power used for a single frame at the same data rate. Transmissions over the reverse traffic channel (R-TCH) for voice over Internet Protocol (VoIP) can be operated at a FER of 1%. Similar target FERs can be expected of access probe transmissions as well. The wireless channel in cellular networks is generally uncorrelated between frame durations (since the coherence time of the wireless channel for most pedestrian/vehicular speeds is less than an frame duration). As a result, the frame-error process can be modeled as an independent and identically distributed (i.i.d.) random process and in particular by a Bernoulli random process. For an access probe of size L frames, achieving a message-error-rate (MER) of say 1%, will require a target FER(L) of:

$$FER(L) = 1 - (1 - MER)^{1/L} \quad (3)$$

Figure 5A:
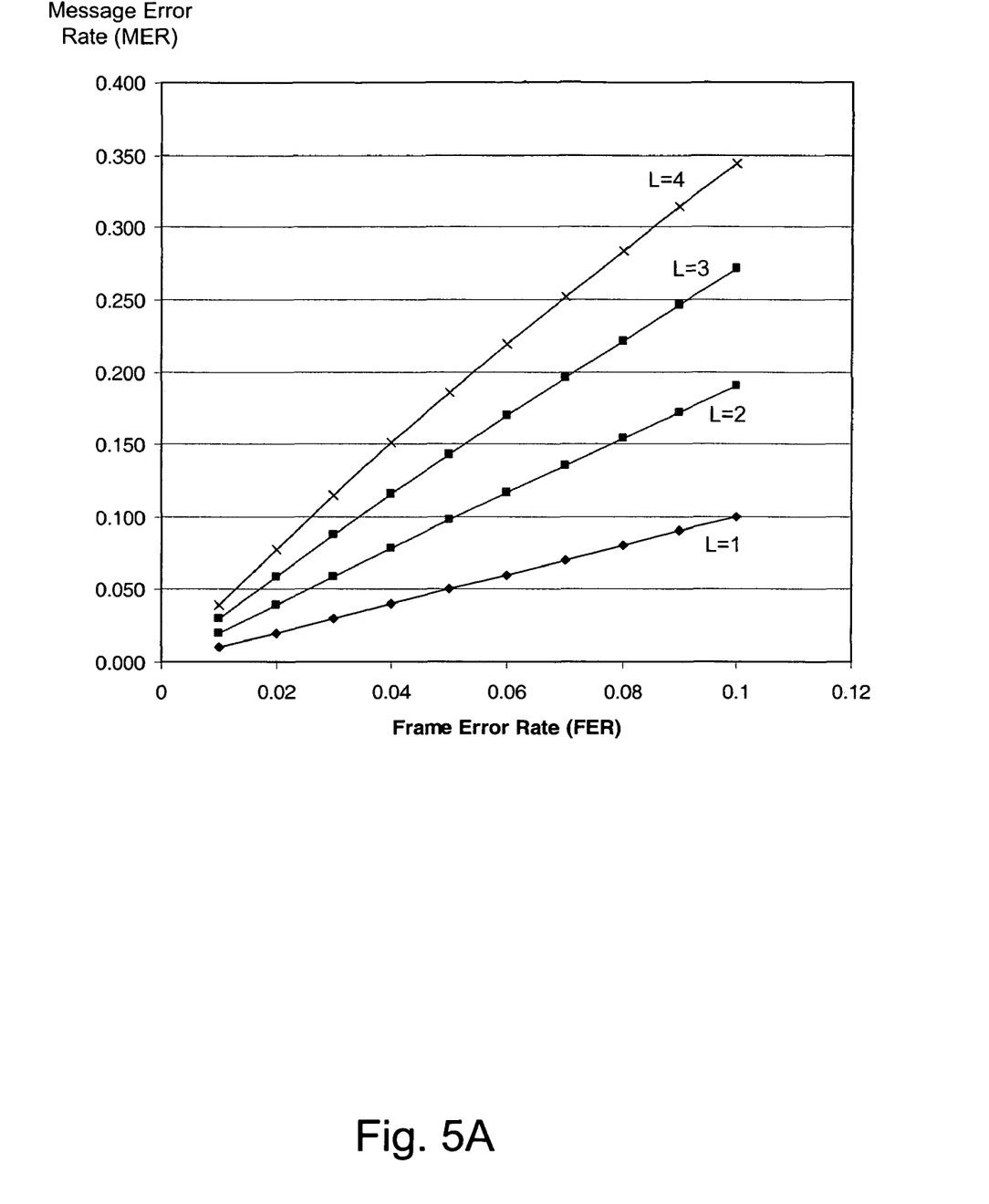
FIG. 5A is a graph illustrating the effect of message size on the message error rate for given frame error rates.

Generally, as used herein message can by considered the access probe and the MER can be considered to be related to the frame size of the access probe as illustrated in FIG. 5A. As can be seen from FIG. 5A, the message error rate rises at increasing rates as the frame size increases.

Figure 5B:
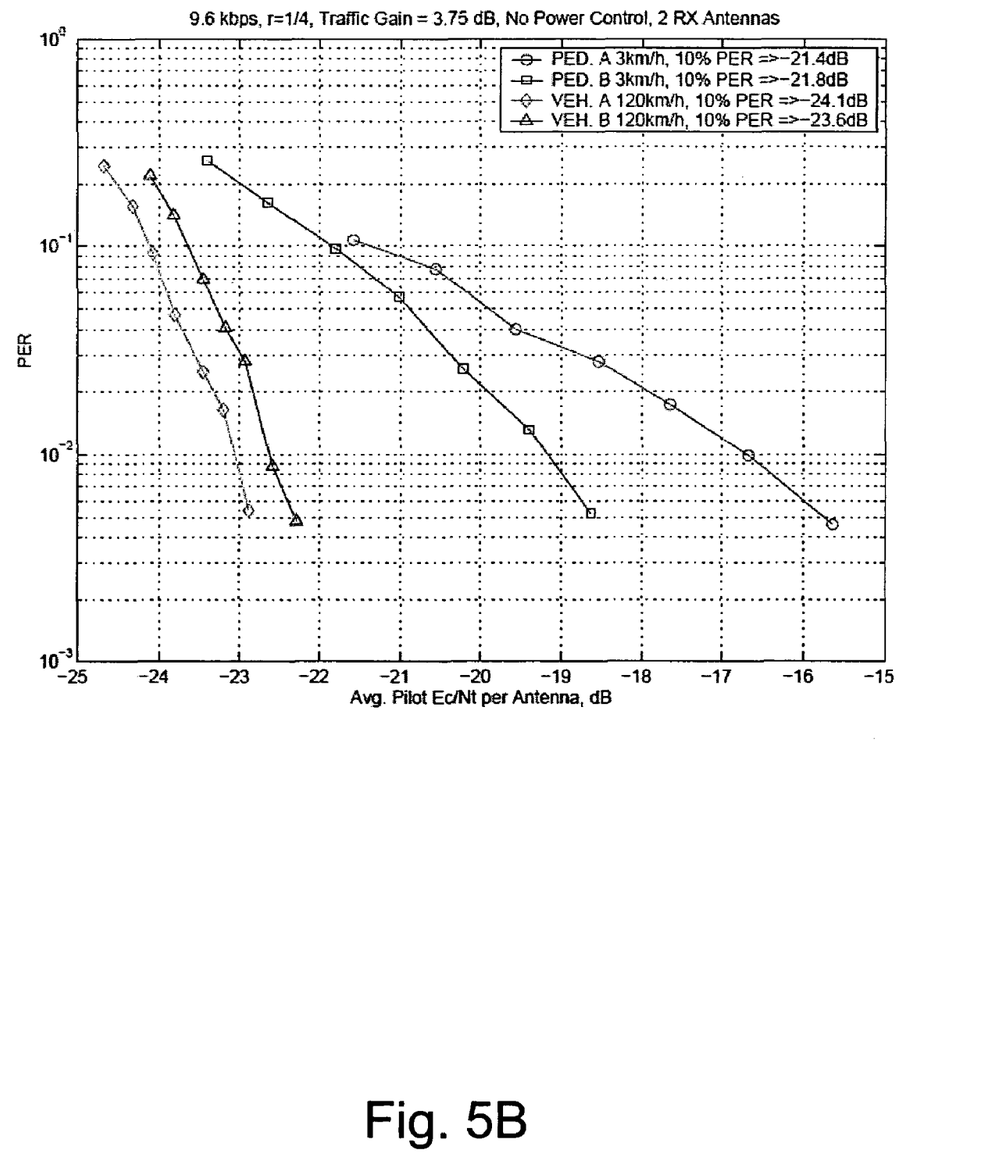
FIG. 5B is a graph illustrating a relationship between frame error rate and given wireless system conditions.

Further, referring to FIG. 5B a graph of PER (FER$^2$) versus the pilot SNR (Ec,p/Nt) per antenna for different wireless channels with power control disabled (therefore R-TCH transmissions are identical to Access Transmissions) is illustrated. Accordingly, it can be determined that to achieve a target MER=1%, for L=2, FER(2)=0.5% and L=4, FER(4) =0.25%. Based on results in FIG. 5B, this would require an additional 0.5 dB and 1 dB increase in transmit power respectively in order to achieve a target MER of 1% over an entire range of vehicular speeds. If the operating FER is 10%, then FER(2)=5.13% and FER(4)=2.6%. For these error-rates, a correction factor of 1 dB and 2 dB for L=2 and L=4, respectively, can be used to achieve acceptable performance. These correction terms can be determined directly from FIG. 5B. Additionally, in FIG. 5B, the PER plotted along the Y-axis is not the FER of the frame but equal to FER$^2$.

Those skilled in the art will appreciate that similar calculations/simulations and/or empirical data can be obtained for other system parameters and conditions that will allow the determination of the correction factor based on the FER. The FER can be established based on the message size (L) and the target message-error-rate (MER) as discussed in the foregoing (e.g., as in Eq. 3). In general, those skilled in the art will appreciate that a small correction term can be used for messages that span L frames where L>1. The magnitude of the correction term is a function of the number of frames spanned by the access probe as well as the target message-error-rate that is desired.

As discussed above, the conventional open-loop power control algorithm does not take the size of the message into consideration. All messages regardless of their length are transmitted at the same signal power. It also assumes that the channel is likely to be constant over the transmission duration of the message. In contrast, embodiments of the present invention transmit longer messages at a higher minimum SNR of the pilot transmitted by the handset along with probe ($\gamma_{min}$) value, which can be represented as:

$$\gamma_{min}(L) > \gamma_{min}(L-1) > \ldots \gamma_{min}(1). \quad (4)$$

Typically, $\gamma_{min}(1)$ is about −15 dB. Accordingly, the transmit power can be adjusted based on the message size.

Further, the conventional open-loop power control algorithm for the reverse enhanced access channel (R-EACH) tends to overestimate path parameter (G) by dividing the total received pilot signal power from all the access terminals in its active set by the transmit power of its associated access point. Due to this over-estimation of G, the transmit power P(L) can often times be set to a value that is less than the minimum power that will ensure successful delivery of the access probe, where P(L) is determined as:

$$P(L) = \frac{I_t}{G} \gamma_{min}(L). \quad (5)$$

Eq. 5 is given in linear terms, which can be easily converted to dB as will be appreciated by those skilled in the art. However, embodiments of the invention are not limited to calculating the correction factor in dB. Any units can be used that are consistent as known to those skilled in the art. Accordingly, the values of the initial power can be described in linear terms if desired. Further, as discussed above, the concept of a correction factor is broadly construed and can include replacing the conventional calculation (e.g., Eq. 1). For example, Eq. 5 can be used as a complete substitution for the conventional calculation. Accordingly, the corrected initial power determination can be determined as P'$_{init}$=P(L).

In the above formula, $\gamma_{min}(L)$ can be predetermined at the access terminal based on the target MER constraint, the size of the access probe L and the channel correlation coefficient. The path parameter G can also be determined accurately by the access terminal by dividing the received pilot signal power from its associated access point by the transmission power at the access point (BTS). The transmission power can be, specified for example, in the Enhanced Access Parameters message or can be assumed to be a predetermined value which is generally set to about 10-20 Watts. The signal interference and thermal noise It can be determined by assuming that the interference power incident at the access terminal is the same as the interference at the access point (BTS).

Figure 6:
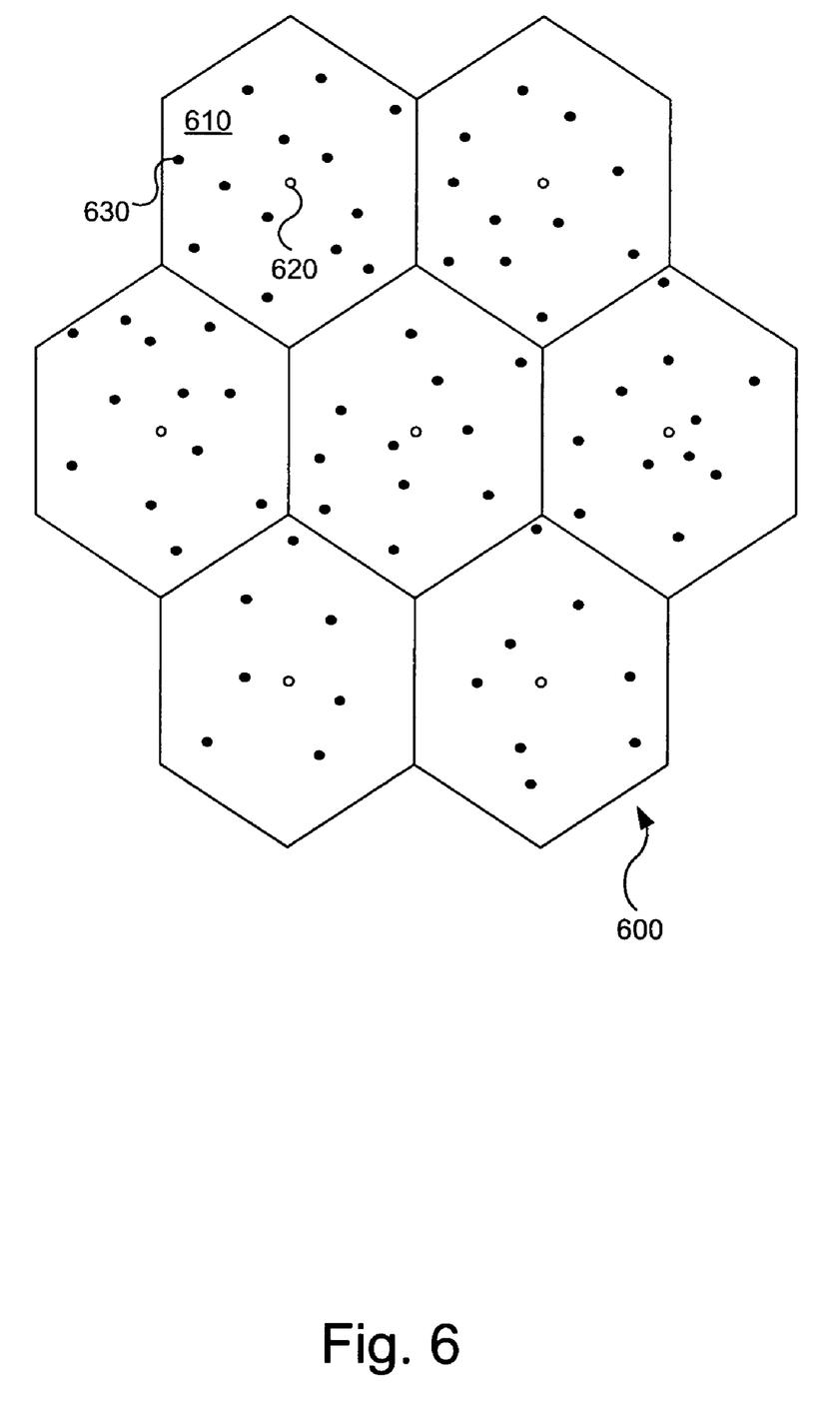
FIG. 6 is an illustration of a wireless network topology having a plurality of cells, base stations and mobile terminals.

A simple numerical experiment to determine the amount of overestimation in G by access terminals when they are scattered across a large-scale cellular network (e.g., a 1x network)

can illustrate this problem. Specifically, consider a cellular network 600 having seven cells 610, each having an access point (BTS) 620 and associated access terminals 630, as illustrated in FIG. 6. The path-loss between the access terminal and the access point can be considered to be purely a function of the Euclidean distanced between them (e.g., in this example the path-loss exponent for this example was assumed to be 2.8). The transmit power of each access point on the pilot channel was set to 20/64 Watts (e.g., 20 Watts distributed equally over 64 orthogonal Walsh codes, one of which is used for the Forward Pilot Channel (F-PICH). For this network topology, G computed by conventional open-loop algorithm ranges from 0-223% greater than the actual value with nearly half the mobiles overestimating G by 47%. As a result of this overestimation in G, the transmit power P(L) determined by the open-loop algorithm is less than the desired value by at least a factor of 1.5 for half the mobiles in the network and as many as one quarter of the mobiles underestimate their transmit power by a factor of 2. In the foregoing example, the path-loss was assumed to be purely a function of the distance.

Accordingly, in one embodiment of the invention the demodulated signal power of the pilot corresponding to an associated access point is used to determine G, instead of the sum of pilot signal powers of all the access points in the active set being used to determine G, such as in conventional systems. Improving the estimate of G, will improve the determination of P(L) and can be used directly in previously described Eq. 5.

Alternatively, the transmit power P(L) can be increased by a factor of ~1.1-~3 (~0.5 dB-~4.7 dB) when the total received pilot signal strength at the access terminal from neighboring access points is comparable to the pilot signal strength of the access point that the access terminal is associated with or when there is more than one pilot signal in the active set.

Accordingly, an embodiment of the invention makes RoT information available at the handset prior to a probe transmission, the existing interference correction term $I_t$ can be ignored in calculating the transmit power and an improved RoT correction term can be applied in its place. In one embodiment of the invention, the access point (BTS) broadcasts its load and/or the RoT periodically (e.g., in the Enhanced Access Parameters message). The access terminal can then use this information to calculate the effective noise floor and hence, the transmit power with greater accuracy by overcoming the RoT.

Path-Loss Determination and Correction

As noted above, one of the time-varying inputs in determining the open-loop transmit power is the path-loss. The value of path-loss is estimated by taking the ratio of the received pilot signal power at the handset with respect to the power of the pilot signal as transmitted by the access point (e.g., BTS). The nominal transmit power of a BTS typically is 10 Watts. However, instead of using the energy of the demodulated pilot signal, this algorithm includes the cumulative pilot energy from all the BTS's in the active set of the access terminal. Accordingly, for access terminals in a 3-way equal power soft-handoff, this approximation results in an underestimation of the path-loss by a third of its actual value. Therefore a static correction that boosts the received pilot energy by a factor of 3 is adequate to correct the erroneous path-loss estimate. This corresponds to an increase in power of about 4.7 dB. A correction of 3 dB can be used to correct the path-loss estimate and this 3 dB correction can be incorporated in the OpenLoopAdjust term in 1xEVDO, for example, and in similar terms in other networks. Based on simulation results, a 3 dB increase in transmit power can be considered adequate for all the access terminals in the network, assuming that the pilot strength of its associated sector is the highest among all the pilot signals in the active set. Further, in some networks (e.g., a 1x network), a 2 dB correction may be adequate for approximately 75% of the access terminals. Therefore, a static correction in the order of ~0.5-4.7 dB can be an effective way to correct the estimated path-loss, as discussed herein.

A more refined approach to correcting the path-loss may be desirable when the frequency of Access Probe transmissions is high and transmitting at high powers frequently on the Access Channel, can be undesirable. In such cases, a precise approach to correcting the pilot strength can take into account the pilot strength from all the access points (BTSs) in the access terminal active set. Assuming that an access terminal is able to hear a pilot signal from K sectors in its active set and the received pilot power from sector k is $PS_k$ (in mW) and the access terminal is associated with sector i, the following correction term can be computed based on the following rules:

correction term at handset i in $$dB = \max\left\{10\log_{10}\left(\frac{\sum_{k \in AS_i} PS_k}{\tilde{\alpha} PS_i}\right), 0\right\}, \qquad (6)$$

where $AS_i$ denotes the active set of access terminal i and $\alpha$ is a factor that is conventionally used in correcting the received pilot-strength and is recommended to be set to 2. However, embodiments of the invention are not limited to this specific value for $\alpha$, which may be adjusted by system engineers. Further, since it is possible that the received pilot strength from the associated BTS is not necessarily the highest value, it is possible that $$\tilde{\alpha} PS_i < \sum_{k \in AS_i} PS_k \qquad (7)$$

and a positive correction term is introduced as a result.

Correction to Pilot Strength Estimate Due to Infrequent Sampling Prior to 1st Access Attempt When an access terminal is in the idle/sleep state (e.g., when not active in a call), the access terminal wakes up from the idle state periodically every paging interval (e.g., 426 or 213 msec.) to listen to an overhead channel for, a message directed to the access terminal (e.g., a QuickConfig message). The access terminal can read this message to determine if it has to decode the associated information (e.g., SCC packet). For example, upon detection of the message, the access terminal remains awake to decode the SCC message, if instructed to do so. Otherwise, the access terminal returns to the idle state for the remainder of the paging interval. The above process repeats itself every paging interval.

Additionally, when the access terminal wakes up to read the message (e.g., QuickConfig message), it also measures the pilot signal strength of its associated BTS as well as all the neighboring BTS's that are within range of the access terminal. This instantaneous pilot strength is measured every slot and this value is passed through an Infinite impulse response (IIR) filter. The default value of the time-constant of this IIR filter can be denoted by PilotStrengthFilterTC and is typically 64 slots. The smallest permissible value of this parameter is typically 32 slots. Although this setting maybe adequate for accurate pilot strength measurements of the wireless channel once the reverse traffic channel is established, it can be highly inaccurate prior to the first transmission (access attempt) by the access terminal. Reasons for this include that in the idle state:

1. The sampling rate of pilot measurements is very low (once every 213 or 426 msec.).

2. Only a few samples are collected in each sampling interval since the access terminal is awake for an extremely short time every paging interval (e.g., only long enough to read the QuickConfig message).

However, wireless channels in mobile environments change at a relatively fast rate. For example, in the 1.8 GHz band, the Doppler spread can be as high as 200 Hz in which case the channel coherence time is approximately ½₀₀ or 5 msec. In general, for most vehicular speeds in the 1.8 GHz band the channel in one frame duration (26.67 msec) can be assumed to be uncorrelated to the channel strength in the subsequent frame duration.

An inaccurate pilot strength measurement can cause the open-loop power control algorithm to determine a transmit power that is less than the desired value, which may result in an increased failure rate of the access probe on the first attempt. Additionally, messages that are likely to suffer as a result of inaccuracy in pilot strength measurement can include: CALL, ConnectionRequest and RouteUpdate message. Using the above-referenced considerations, an appropriate correction term can then be determined to ensure improved reliability of access probe reception on the first access attempt.

As discussed in the foregoing, embodiments of the invention can improve system latency which can benefit all applications but is particularly important to delay sensitive applications. A group communication system is an example of a delay sensitive system that can take advantage of reduced connection times offered by the embodiments of the invention disclosed herein. The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a, group member wishes to transmit information to other members of the group, the member may request the transmission privilege by pressing a push-to-talk button or key on an AT, which generates a request formatted for transmission over a distributed network. For example AT 102, the request may be transmitted over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed-network RAN 120. However, the requests may also be transmitted through the public switched telephone network (PSTN) to a carrier network 126. The carrier network 126 may receive the request and provide it to distributed network 120.

Figure 7:
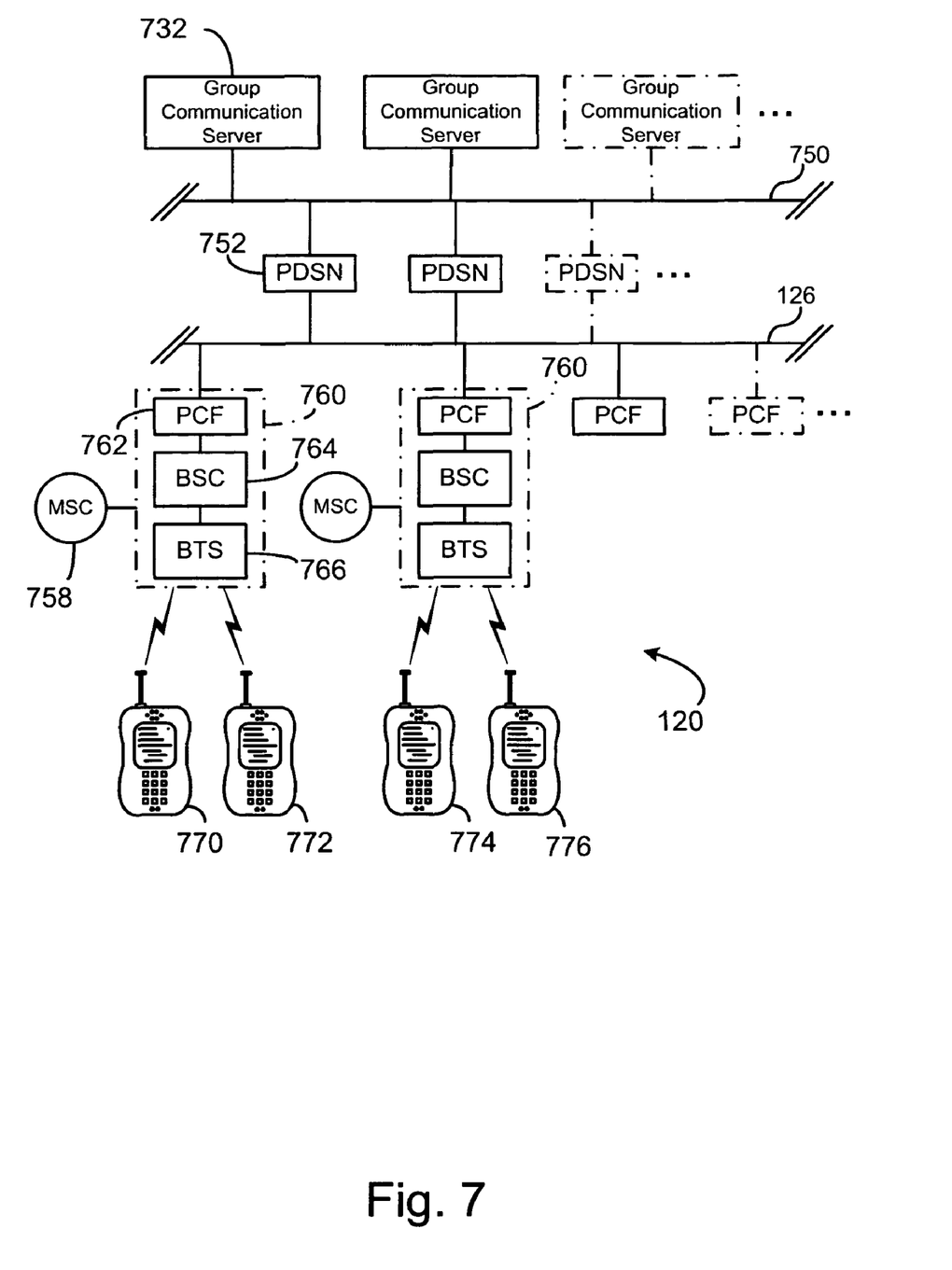
FIG. 7 is an illustration of a group communication network in accordance with at least one embodiment of the invention.

Referring to FIG. 7, one or more group communication servers 732, can monitor traffic of the group communication system through its connection to distributed network 120. Since group communication server 732 can be connected to the distributed network 120 through a variety of wired and wireless interfaces, geographic proximity to group participants is not necessary. Typically, a group communication server 732 controls communications between the wireless devices of group members (ATs 770, 772, 774, 776) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 732 can be connected to a group communication server LAN 750.

The group communication server(s) 732 can be connected to a wireless service provider's packet data service node (PDSN) such as PSDN 752, shown here resident on a carrier network 126. Each PSDN 752 can interface with a base station controller 764 of a base station 760 through a packet control function (PCF) 762. The PCF 762 may be located in the base station 760. The carrier network 126 controls messages (generally in the form of data packets) sent to a MSC 758. The MSC 758 can be connected to one or more base stations 760. In a similar manner to the carrier network, the MSC 758 is typically connected to the BTS 766 by both the network and/or Internet for data transfer and PSTN for voice information. The BTS 766 ultimately broadcasts and receives messages wirelessly to and from the wireless ATs, such as cellular telephones 770, 772, 774, 776, as is well known in the art. Accordingly, the details of a group communication system will not be further discussed.

As discussed in the foregoing, the RoT at the access point can be transmitted to the access terminal so the actual RoT value is available at the access terminal to include in the correction factor and provide a more accurate determination of the required initial transmit power. However, broadcasting this value over an overhead channel may unnecessarily consume system bandwidth, especially for applications that are insensitive to system latency. Still, it would be desirable to transmit the RoT for applications that are sensitive to system latency. Accordingly, in one embodiment of the invention, an access point can detect a group communication request from the group communication server, such as an initial page to set up the group call. After the group communication request has been identified, the access point can transmit the RoT prior to or in conjunction with the page to access terminals in its sector. Thus, the receiving access terminals can use this information as discussed herein to more accurately determine an initial transmit power for the first access probe transmission. Therefore, delays due to failed access probe attempts can be reduced.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying a method for determining an access probe transmit power in accordance with the methods, algorithms, steps and/or functions disclosed herein. For example, an embodiment of the invention can include a computer-readable medium on which is stored a computer program for determining an access probe transmit power. The computer program comprising instructions which, upon being executed, causes the computing device to perform a process of: estimating a reverse channel condition based on a received signal from an access point; determining a correction factor based on at least one of a number of access points detected, a Rise-over-Thermal (RoT) at the access point, a target message error rate, and a message size; and applying the correction factor to an open-loop access probe transmit power determination.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for determining an access probe transmit power comprising:

estimating a reverse channel condition based on a received signal from an access point;

determining a correction factor based on at least one of a number of access points detected, a Rise-over-Thermal (RoT) at the access point, a target message error rate, or a message size; and applying the correction factor to an open-loop access probe transmit power determination, wherein the received signal is a pilot signal and the number of access points detected is determined by a number of pilot signals in an active set in an access terminal receiving the pilot signals and wherein if the number of pilot signals in the active set is greater than one, then the correction factor is based only on a demodulated received signal from the access point which is associated with the access terminal.

2. The method of claim 1, wherein the access point is at least one of a base station transceiver, a modem pool transceiver, a transmitter, or a line amplifier.

3. A method for determining an access probe transmit power comprising:

estimating a reverse channel condition based on a received signal from an access point;

determining a correction factor based on a number of access points detected; and applying the correction factor to an open-loop access probe transmit power determination, wherein the received signal is a pilot signal and the number of access points detected is determined by a number of pilot signals in an active set in an access terminal receiving the pilot signals, wherein if the number of pilot signals in the active set is greater than one, then the correction factor is a calculated value based on pilot signals in the active set and the pilot signal of the access point which is associated with the access terminal, and wherein the correction factor is calculated as:

$$\text{Correction factor} = \max\left\{10\log_{10}\left(\frac{\sum_{k\in AS_i} PS_k}{\tilde{\alpha} PS_i}\right), 0\right\}$$

where Correctionfactor is the correction factor in units of dB for access terminal i, $AS_i$ is an active set of access terminal i, $PS_k$ is a power of a pilot signal received from access point k, $PS_i$ is a power of the pilot signal received from the access point associated with access terminal i, and $\tilde{\alpha}$ is a factor for correcting the received pilot power.

4. The method of claim 3, wherein $\tilde{\alpha}$ is about 2.

5. A method for determining an access probe transmit power comprising:
   estimating a reverse channel condition based on a received signal from an access point;
   determining a correction factor based on a Rise-over-Thermal (RoT) at the access point;
   applying the correction factor to an open-loop access probe transmit power determination;
   receiving the RoT from the access point at the access terminal;
   determining sector loading based on the RoT received from the access point; and
   increasing the correction factor based on sector loading, which results in an increased access probe transmit power determination.

6. A method for determining an access probe transmit power comprising:
   estimating a reverse channel condition based on a received signal from an access point;
   determining a correction factor based on at least one of a target message error rate or a message size;
   applying the correction factor to an open-loop access probe transmit power determination;
   receiving the RoT from the access point at the access terminal; and
   increasing the correction factor as the message size increases, which results in an increased access probe transmit power determination.

7. The method of claim 6, wherein the magnitude of the correction factor is a function of message size (L) and the target message-error-rate (MER).

8. The method of claim 7, further comprising:
   calculating a frame-error-rate (FER) based on the message size (L) and the target message-error-rate (MER), as:

$$FER(L) = 1 - (1 - MER)^{\frac{1}{L}}.$$

9. The method of claim 8, further comprising:
   determining the correction factor based on the calculated FER.

10. An apparatus comprising:
    logic configured to estimate a reverse channel condition based on a received signal from an access point;
    logic configured to determine a correction factor based on at least one of a number of access points detected, a-Rise-over-Thermal (RoT) at the access point, a target message error rate, or a message size; and
    logic configured to apply the correction factor to an open-loop access probe transmit power determination, wherein the received signal is a pilot signal and the number of access points detected is determined by a number of pilot signals in an active set in an access terminal receiving the pilot signals and wherein if the number of pilot signals in the active set is greater than one, then the correction factor is based only on a demodulated received signal from the access point which is associated with the access terminal.

11. The apparatus of claim 10, wherein the access point is at least one of a base station transceiver, a modem pool transceiver, a transmitter, or a line amplifier.

12. The apparatus of claim 10, wherein the apparatus is an access terminal.

13. An apparatus comprising:
    logic configured to estimate a reverse channel condition based on a received signal from an access point;
    logic configured to determine a correction factor based on a number of access points detected; and
    logic configured to apply the correction factor to an open-loop access probe transmit power determination,
    wherein the received signal is a pilot signal and the number of access points detected is determined by a number of pilot signals in an active set in an access terminal receiving the pilot signals, wherein if the number of pilot signals in the active set is greater than one, then the correction factor is a calculated value based on pilot signals in the active set and the pilot signal of the access point which is associated with the access terminal, and wherein the correction factor is calculated as:

$$\text{Correction factor} = \max\left\{10\log_{10}\left(\frac{\sum_{k\in AS_i} PS_k}{\tilde{\alpha} PS_i}\right), 0\right\}$$

where Correctionfactor is the correction factor in units of dB for access terminal i, $AS_i$ is an active set of access terminal i, $PS_k$ is a power of a pilot signal received from access point k, $PS_i$ is a power of the pilot signal received from the access point associated with access terminal i, and $\tilde{\alpha}$ is a factor for correcting the received pilot power.

14. The apparatus of claim 13, wherein $\tilde{\alpha}$ is about 2.

15. An apparatus comprising:
    logic configured to estimate a reverse channel condition based on a received signal from an access point;
    logic configured to determine a correction factor based on a number of access points detected;
    logic configured to apply the correction factor to an open-loop access probe transmit power determination;
    logic configured to receive the RoT transmitted from the access point at the access terminal;
    logic configured to determine sector loading based on the RoT received from the access point; and
    logic configured to increase the correction factor based on sector loading, which results in an increased access probe transmit power determination.

16. The apparatus of claim 15, wherein the apparatus is a communication system comprising the access point and the access terminal.

17. An apparatus comprising:
    logic configured to estimate a reverse channel condition based on a received signal from an access point;
    logic configured to determine a correction factor based on at least one of a number of access points detected, a-Rise-over-Thermal (RoT) at the access point, a target message error rate, or a message size;
    logic configured to apply the correction factor to an open-loop access probe transmit power determination; and logic configured to increase the correction factor as the message size increases, which results in an increased access probe transmit power determination.

18. The apparatus of claim 17, wherein the magnitude of the correction factor is a function of message size (L) and the target message-error-rate (MER).

19. The apparatus of claim 18, further comprising:
logic configured to calculate frame-error-rate (FER) based on the message size (L) and the target message-error-rate (MER), as:

$$FER(L) = 1 - (1 - MER)^{\frac{1}{L}}.$$

20. The apparatus of claim 19, further comprising:
logic configured to determine the correction factor based on the calculated FER.

21. A system for determining an access probe transmit power comprising:
means for estimating a reverse channel condition based on a received signal from an access point;
means for determining a correction factor based on at least one of a number of access points detected, a Rise-over-Thermal (RoT) at the access point, a target message error rate, or a message size; and
means for applying the correction factor to an open-loop access probe transmit power determination, wherein the received signal is a pilot signal and the number of access points detected is determined by a number of pilot signals in an active set in an access terminal receiving the pilot signals and wherein if the number of pilot signals in the active set is greater than one, then the correction factor is based only on a demodulated received signal from the access point which is associated with the access terminal.

22. The system of claim 21, wherein the access point is at least one of a base station transceiver, a modem pool transceiver, a transmitter, or a line amplifier.

23. A system for determining an access probe transmit power comprising:
means for estimating a reverse channel condition based on a received signal from an access point;
means for determining a correction factor based on a Rise-over-Thermal (RoT) at the access point;
means for applying the correction factor to an open-loop access probe transmit power determination;
means for receiving the RoT from the access point at the access terminal;
means for determining sector loading based on the RoT received from the access point; and
means for adjusting the correction factor based on sector loading.

24. A computer-readable medium on which is stored a computer program for determining an access probe transmit power, the computer program comprising instructions which, upon being executed, causes the computing device to perform a process of:
estimating a reverse channel condition based on a received signal from an access point;
determining a correction factor based on at least one of a number of access points detected, a Rise-over-Thermal (RoT) at the access point, a target message error rate, or a message size; and
applying the correction factor to an open-loop access probe transmit power determination,
wherein the received signal is a pilot signal and the number of access points detected is determined by a number of pilot signals in an active set in an access terminal receiving the pilot signals and wherein if the number of pilot signals in the active set is greater than one, then the correction factor is based only on a demodulated received signal from the access point which is associated with the access terminal.

25. The computer-readable medium of claim 24, wherein the access point is at least one of a base station transceiver, a modem pool transceiver, a transmitter, or a line amplifier.

* * * * *